United States Patent

Menz

[11] Patent Number: 5,563,742
[45] Date of Patent: Oct. 8, 1996

[54] REARVIEW MIRROR FOR A BICYCLE

[75] Inventor: Erika Menz, Illertissen, Germany

[73] Assignee: Franz-Josef von Braun, München, Germany; a part interest

[21] Appl. No.: 277,271

[22] Filed: Jul. 21, 1994

[30] Foreign Application Priority Data

Jul. 21, 1993 [DE] Germany ............... 43 24 501.3

[51] Int. Cl.⁶ .................. B60R 1/08; G02B 5/08
[52] U.S. Cl. .............. 359/842; 359/871; 359/872; 359/881; D12/187; 248/476; 248/481
[58] Field of Search ............... 359/842, 881, 359/838, 844, 850, 855, 866, 871, 872, 882, 550; D12/187, 411; 248/466, 475.1, 476, 479, 481

[56] References Cited

U.S. PATENT DOCUMENTS

| | | | |
|---|---|---|---|
| 3,905,678 | 9/1975 | Blasy et al. | 359/550 |
| 3,981,567 | 9/1976 | Cululi et al. | 359/842 |
| 3,995,945 | 12/1976 | Addicks | 359/842 |
| 4,135,788 | 1/1979 | Sargis | 359/842 |
| 4,326,774 | 4/1982 | Beigl | 359/842 |
| 4,826,326 | 5/1989 | Grissen et al. | 359/842 |
| 5,148,327 | 9/1992 | Gaxiola, Jr. | 359/855 |

Primary Examiner—Thong Nguyen
Assistant Examiner—John Juba, Jr.
Attorney, Agent, or Firm—Browdy and Neimark

[57] ABSTRACT

A rearview mirror for a bicycle is disclosed, having a mounting (2) intended to be fastened on a tube of the bicycle and a mirror holder (4) which is hinged on the mounting in its close vicinity and supports a mirror (12) which is characterized in that the mirror has a recess (48) in its lower edge area which is used to receive the tube, wherein the recess is of such a size that in the working position of the mirror the mirror surface is downwardly extended on both sides of the tube.

13 Claims, 4 Drawing Sheets

REARVIEW MIRROR FOR A BICYCLE

FIELD OF THE INVENTION

The present invention relates to a rearview mirror for a bicycle. Generally, a rearview mirror is already known from U.S. Pat. No. 3,981,567.

BACKGROUND OF THE INVENTION

Bicycles with rearview mirrors are already known, which have two rearview mirrors which are fastened on long rods and are placed on respectively the left and right ends of the handlebars and project outward therefrom at an angle. Such a disposition has the disadvantage that the mirrors are damaged if the bicycle crashes. Furthermore, the area which is located axially directly behind the bicycle can only be covered incompletely. Finally, large-surfaced mirrors of this type considerably increase the air resistance and are used increasingly less with modern bicycles for reasons of appearance.

U.S. Pat. No. 3,981,567 shows a recess on the top of the mirror when it is in the operating position which is intended to prevent an interfering contact with the rod elements. However, when fastened to the crossbar, the mirror in accordance with the species does not permit the effective representation of the rear area behind the bicycle located directly below the crossbar.

SUMMARY OF THE INVENTION

It is an object of the present invention to develop such a mirror, so that when the mirror is fastened on the crossbar, the rear viewing area located directly below the crossbar can also be appropriately represented.

The bicycle in accordance with the present invention has a rearview mirror which is designed in a particularly simple structural manner, because the distance between the mounting and the mirror holder is short and it is therefore possible to make the connecting struts between the mirror holder and the mounting short, thus saving material. By disposing the rearview mirror in height between the rear wheel and the seat it is possible for the mirror to show the entire area, particularly the one located axially behind the bicycle, wherein the path of the rays is defined laterally by the legs of the user, on top by the seat and on the bottom by the rear wheel.

In accordance with the invention, the mirror has a recess on its lower edge which is designed in such a way that a tube on which the mounting is fastened can extend through it. The mirror holder fastened on the mounting supports a mirror which therefore has an essentially semicircular recess on its lower edge which is adapted to the tube. If the mirror is tilted in such a way that the tube extends through the recess, the mirror plane extends further downward so that a lower area behind the bicycle can be represented. The recess furthermore is used as an effective support for the mirror on the tube.

It is preferred to connect the mounting by means of a ball joint with the mirror holder. Such a connection is recommended in order to be able to set the mirror holder in any arbitrary position in relation to the mounting. In this way it is possible to take different geometric sizes of bicycles and corresponding body sizes of users into account.

It is furthermore preferred that the mirror has a width which approximately corresponds to the length of a crank shaft. Crank rods are disposed at the respective ends of the crank shaft and are located approximately in the plane of the legs of the user. If the mirror approximately covers the length of the crank shaft, it approximately covers the area which is left open toward the back between the legs of the user as the visible area and in this way the mirror covers the maximally accessible rear viewing area.

It is preferred that the recess takes up at least 35% of the longitudinal dimension of the mirror surface. In this way a sufficient extension on both sides of the mirror surface beyond the tube is possible.

It is furthermore preferred that the mounting is designed as a clip which is placed or pushed on the tube. In this way the rearview mirror can be easily mounted and removed.

It is preferred that in the working position the mirror has an inclination in relation to the horizontal of approximately 30° to 60°, preferably approximately 40° to 50° in particular. At an angle of 45° it is possible to cover the area directly behind the bicycle if the driver looks down on the mirror vertically from above. The preferred working position of the rearview mirror is +/−5° or 10° around this position.

The mounting of the rearview mirror is preferably attached on a crossbar of a man's bicycle. The mounting can be suitably shifted on this bar and brought into the correct position for the user.

Alternatively, on a ladies' bicycle it is preferred to fasten the mounting on a fork column or the down tube when there is no crossbar.

Finally, the mounting can alternatively be fastened on a fork column or a front part of the handlebars if a change of the rear viewing area of the rearview mirror as a function of the steering angle is desired. If the bicycle is turned to the right, the rear viewing area is displaced to the left in relation to the user and vice versa.

It is finally preferred that the mirror is arched, namely out of a transverse plane located crosswise to the frame of the bicycle, so that it is also possible to cover the areas further to the left and further to the right behind the user.

The invention will be described below by means of an exemplary embodiment in connection with the drawings.

DETAIL DESCRIPTION OF EMBODIMENT(S)

Figure 1:
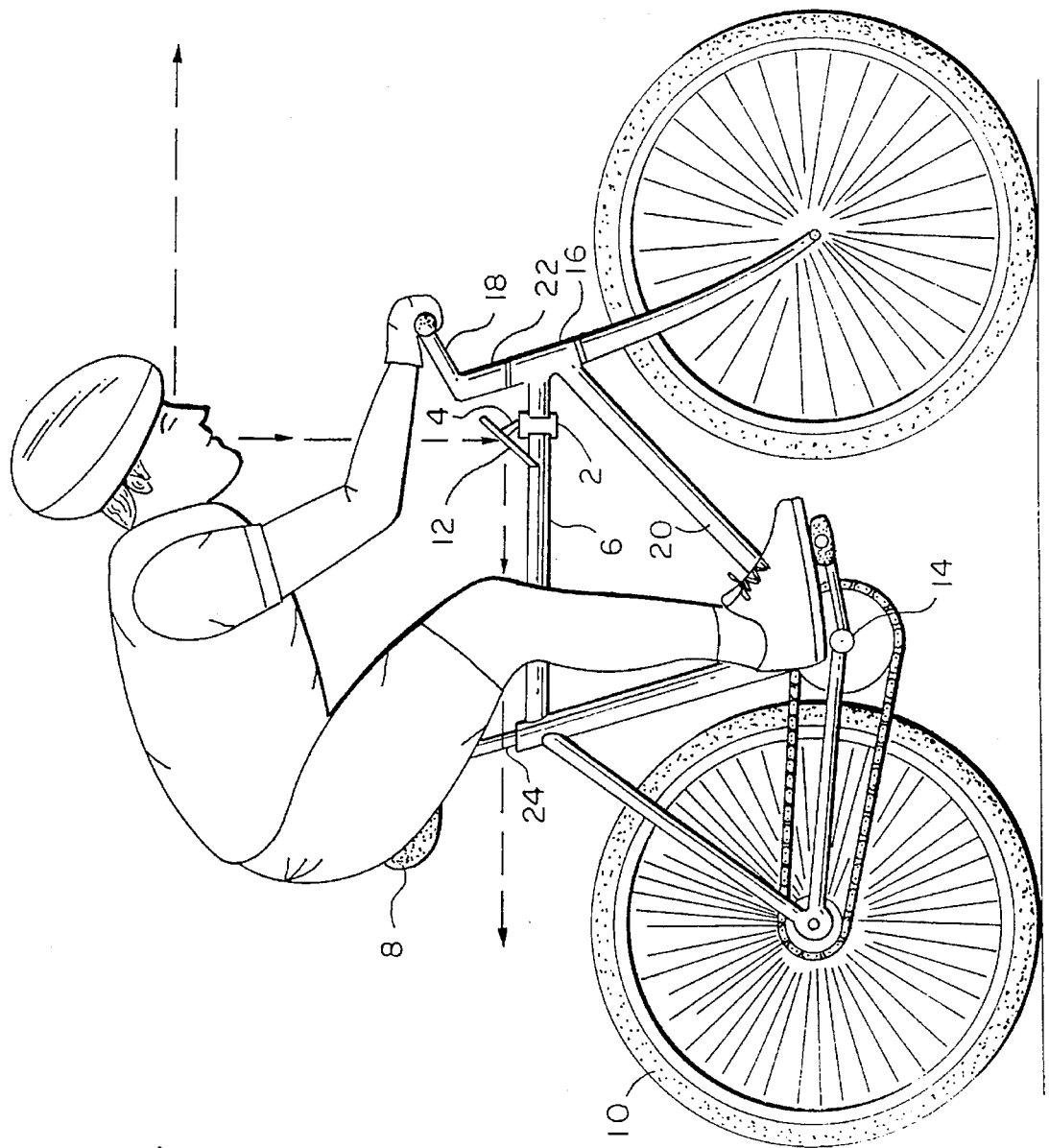
FIG. 1 shows a lateral view of an embodiment of the rearview mirror of the invention on a bicycle.

An ordinary men's bicycle with a crossbar 6 is shown in the drawings, on which a mounting or clamp 2 of a rearview mirror is fastened. The clamp 2 is designed as a clip and is placed on a front area of the crossbar 6 located near the front wheel.

In its working position, the mirror is preferably disposed at an angle of approximately 30° to 60° in respect to the crossbar 6, approximately 45° is particularly preferred. In this position it is possible for a head of a user located vertically above the mirror to visually cover the area directly behind the bicycle. The clip is fastened in the front area of the crossbar at a distance of maximally 40 cm from a fork column 16. The fork column 16 is connected with the front end of the crossbar 6. However, the clamp 2 of the rearview mirror is preferably disposed in an area at a distance of 5 to 15 cm from the fork column 16.

The rearview mirror formed by the clamp 2, the mirror holder 4 and the mirror 12 is disposed between the seat 8 and the rear wheel 10 at such a height that a visual area left open between them can be covered. More precisely expressed, the rearview mirror fastened on the crossbar 6 is at the level of a seat support 24, on the upper end of which the seat 8 is supported.

Figure 2:
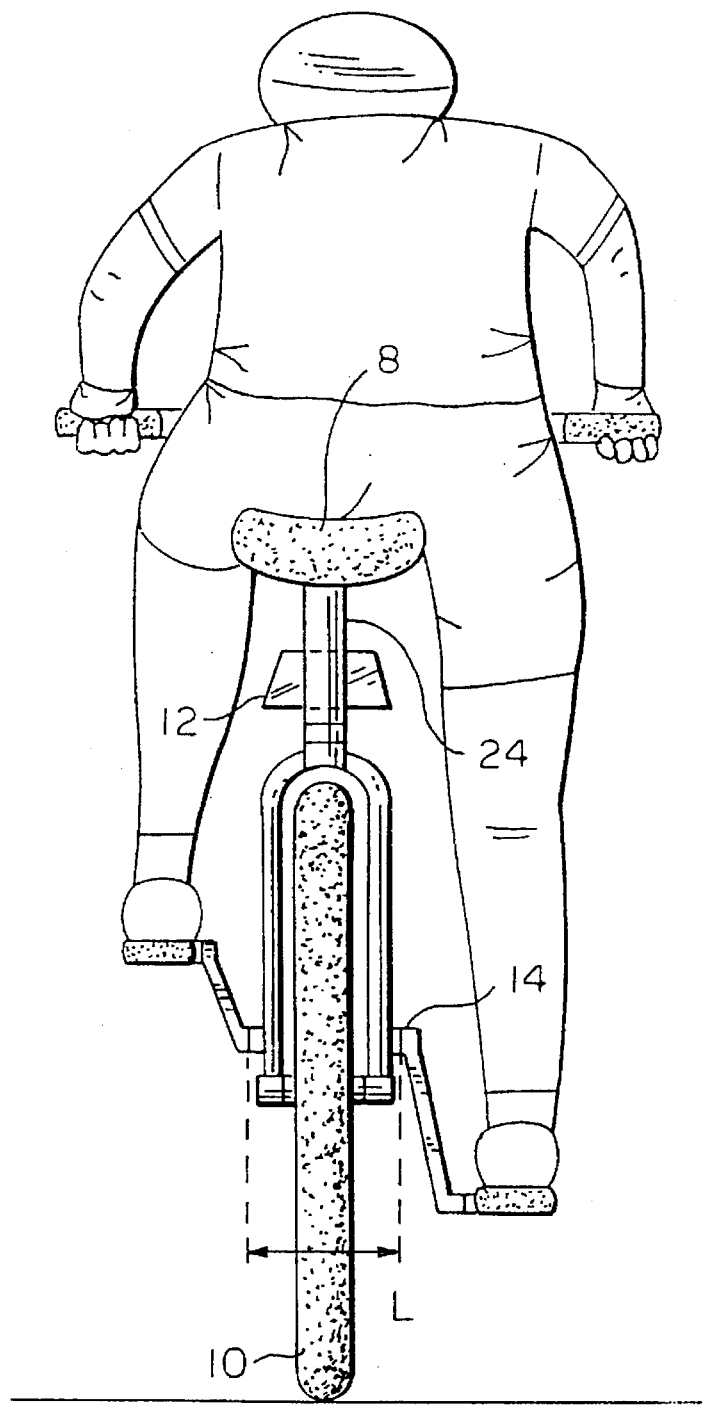
FIG. 2 shows a rear view of the view of FIG. 1

As can be seen in FIG. 2, the mirror 12 is of essentially rectangular shape and has a width which approximately corresponds to that of a crank shaft 14. In this way it is assured that the mirror makes use of the entire free area between the legs of the user. The width of the mirror 12 is approximately the length of a crank shaft L.

In an alternative manner it is possible to fasten the clamp 2 of the rearview mirror on the fork column 16 or a down tube 20, particularly in connection with ladies' bicycles. Furthermore, it is possible to fasten the clamp 2 on a handlebar tube 22 or on a front part 18 of the handlebars if it is desired that the rear viewing area be changed as a function of the steering angle.

Figure 3:
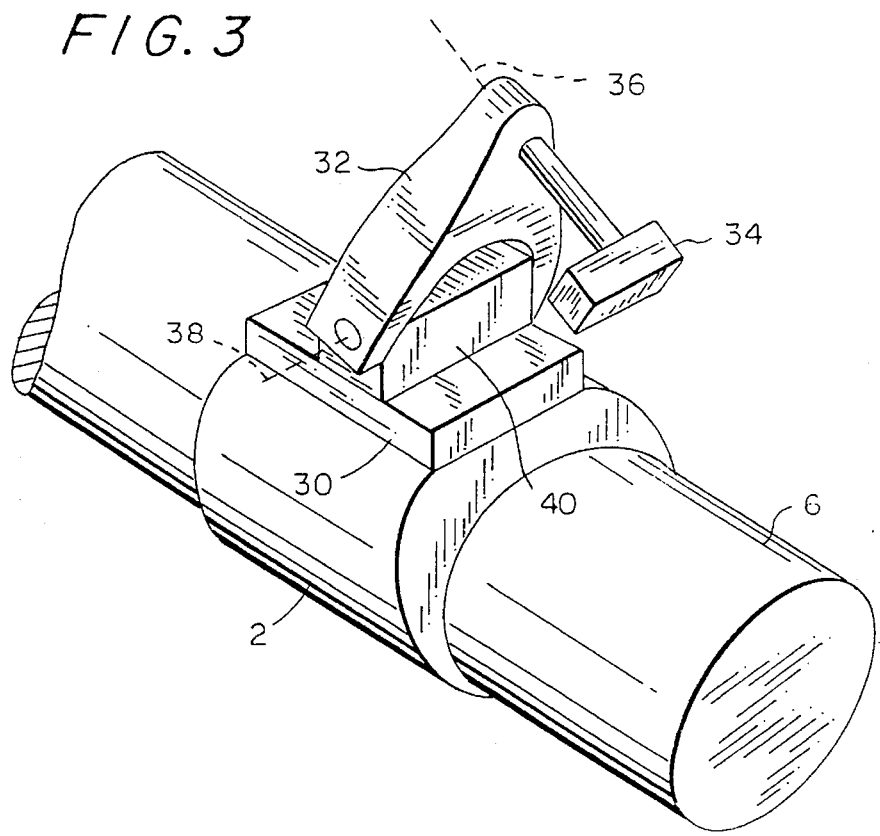
FIG. 3 perspectively shows the structure of the rearview mirror.

FIG. 3 perspectively shows a structure of an embodiment of the clamp and mirror holder of the rearview mirror, wherein a pivot axis 36 and a tilt axis 38 of the rearview mirror are separated from each other. A flat support plate 30 is fastened on the clamp 2 and supports a cuboid support cap 40 in which a bore has been formed crosswise in respect to the bar 6. The bore is used to receive the axis 38 of an approximately horseshoe-shaped tilt joint 32 which is seated, tiltable around the axis 38, on the support cap 40 and thus on the clamp 2. A cylindrical bore intended to receive the pivot axis 36 of a pivot member 34 is located crosswise in relation to the axis 38 on the upper end of the tilt joint 32. The pivot member 34 having the elongated pivot axis 36 is pivotably seated in the bore of the tilt joint 32. The pivot member 34 has a reinforced flat head part on which the mirror 12 is to be fastened. The mirror 12 can be brought into any arbitrary position in relation to the pivot axis 36 and the tilt axis 38.

Figure 4:
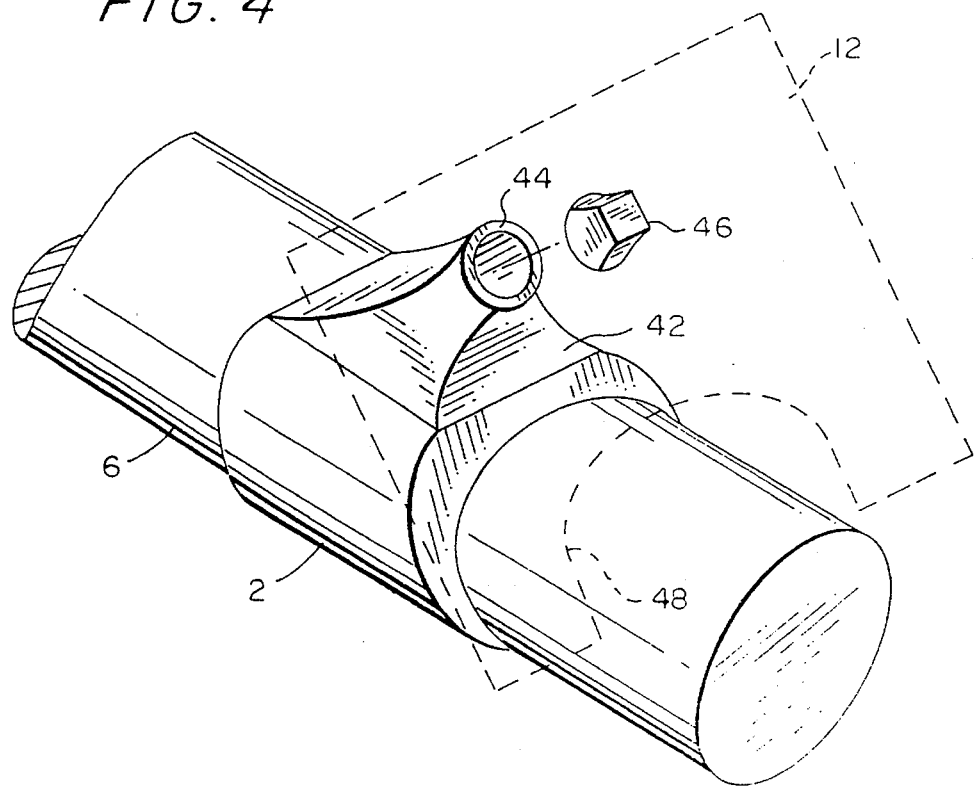
FIG. 4 perspectively shows another structure of the rearview mirror.

The further embodiment of the rearview mirror perspectively represented in FIG. 4 has an upwardly tapering socket holder 42 fastened on the top of the clamp 2, which terminates in a socket 44 formed obliquely on the socket holder 42. The socket 44 is a part of a ball joint and is used to receive a ball head 46, on the back of which the mirror 12 is directly fastened. The mirror 12 inserted into the socket 44 by means of the ball head 46 can be displaced in all direction, i.e. it is tiltable and pivotable. A recess 48 corresponding to the bar 6 is formed in the lower edge area of the mirror 12 through which the bar 6 extends and supports the mirror 12. At the same time, when resting on the bar 6, the mirror 12 is extended downward on both sides of the bar, so that an increased vision area, in particular in the lower area behind the rider, can be covered.

Figure 5:
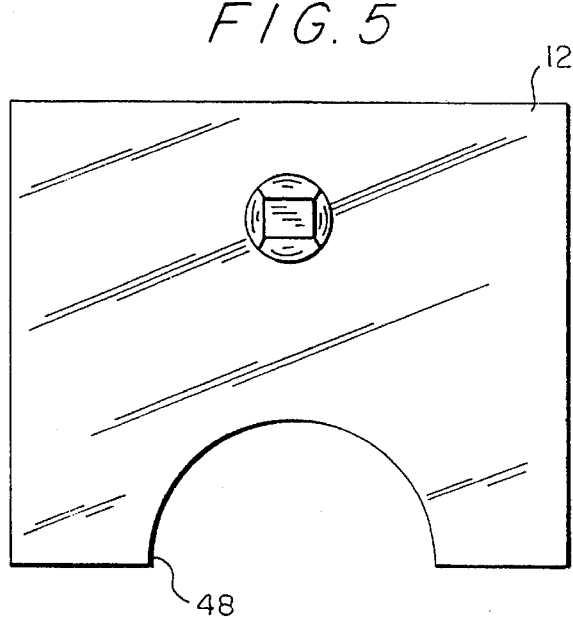
FIG. 5 shows a top view of the rearview mirror of FIG. 4.

FIG. 5 shows a top view of the mirror of FIG. 4. The recess 48 is approximately semicircular in cross section and located centered in the lower area of the mirror. In the long direction it takes up approximately 45% and in the transverse direction approximately 50% of the mirror surface.

Figure 6A:
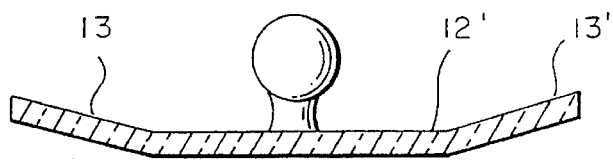
FIG. 6a shows a cross-sectional view of a rearview mirror with angled end sections.

FIG. 6a shows in cross section a mirror 12' with angled edge sections 13 or 13' which abut at an obtuse angle against the center part 12' of the mirror.

Figure 6B:
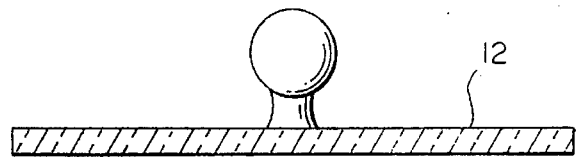
FIG. 6b shows a cross-sectional view of a flat rearview mirror.

FIG. 6b shows the flat or not arched or beveled mirror 12, which is located flat in one plane.

Figure 6C:
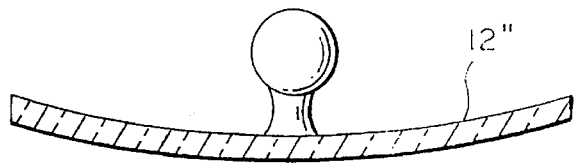
FIG. 6c shows a cross-sectional view of an arched rearview mirror.

FIG. 6c shows an arched mirror 12" in cross section, wherein in cross section the arch is a part of a segment of a circle. With this embodiment it is possible in particular to cover the areas which are more distantly located behind the bicycle. The mirror 12' acts as a wide-angle mirror.

The foregoing description of the specific embodiments reveal the general nature of the invention so that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A rearview mirror for a bicycle comprising:

a mounting (2) for fastening on a tube of the bicycle, and a mirror holder (4), hinged on said mounting in close vicinity to said tube, supporting a mirror (12), wherein said mirror has a recess (48) in a lower edge area thereof for receiving said bicycle tube as the mirror is downwardly extended in a working position, and wherein the mirror surface, in the working position of the mirror, is downwardly extended on both sides of the bicycle tube.

2. A rearview mirror in accordance with claim 1, wherein the mounting (2) is connected with the mirror holder (4) by means of a ball joint (44, 46).

3. A rearview mirror in accordance with claim 1, wherein the mirror (12) (2, 4, 12) has a width parallel to said lower edge which is approximately equal to the length (L) of a crank shaft (14) of said bicycle.

4. A rearview mirror in accordance with claim 1, wherein the recess (48) takes up at least 35% of a length of the mirror surface.

5. A rearview mirror in accordance with claim 1, wherein mounting (2) is a clip which is fastened on the bicycle bar.

6. A rearview mirror in accordance with claim 1, wherein in the working position the mirror has an inclination of approximately 30° to 60°, in relation to horizontal.

7. A rearview mirror according to claim 6, wherein said inclination is about 40° to 50°.

8. A rearview mirror in accordance with claim 1, wherein the mounting (2) is fastened on a crossbar (6) of the bicycle.

9. A rearview mirror in accordance with claim 1, wherein the mounting (2) is fastened on a fork column (16) of said bicycle.

10. A rearview mirror in accordance with claim 1, wherein the mounting (2) is fastened on a handlebar tube (22) of said bicycle.

11. A rearview mirror in accordance with claim 1, wherein the mirror (12") is arched.

12. A rearview mirror in accordance with claim 1, wherein the mounting (2) is fastened on a down tube (20) of said bicycle.

13. A rearview mirror in accordance with claim 1, wherein the mounting (2) is fastened on a front part (18) of the handlebars of said bicycle.

* * * * *